(No Model.)

F. A. THOMAS.
COVER FOR FRUIT BASKETS.

No. 403,156. Patented May 14, 1889.

Witnesses:
Mack A. Claflin
Lew. E. Curtis

Inventor
Frederick A. Thomas
By Munday Evarts & Adcock
his Attorneys

UNITED STATES PATENT OFFICE.

FREDERICK A. THOMAS, OF CHICAGO, ILLINOIS.

COVER FOR FRUIT-BASKETS.

SPECIFICATION forming part of Letters Patent No. 403,156, dated May 14, 1889.

Application filed March 25, 1889. Serial No. 304,668. (No model.)

*To all whom it may concern:*

Be it known that I, FREDERICK A. THOMAS, a citizen of the United States, residing in Chicago, in the county of Cook and State of Illinois, have invented a new and useful Improvement in Covers for Fruit-Baskets, of which the following is a specification.

My invention relates to the construction of the covers of fruit baskets and packages. A common form of cover for these baskets consists of slats made of thin stuff which easily yield and bend under the weight put upon them in the piling, so that they impinge upon and bruise the fruit in the basket. This is not a surprising result when it is known that baskets containing from two to three hundred pounds weight are frequently piled in a single pile. My invention, which concerns this class of covers, is designed to obviate this evil; and it consists of a cover having both an upper and a lower row of slats, the lower row being light enough to gently press the fruit and hold it place, while the upper row is adapted to sustain the weight of the baskets piled upon it.

The nature of the invention is fully disclosed in the accompanying drawings, in which—

Figure 1:
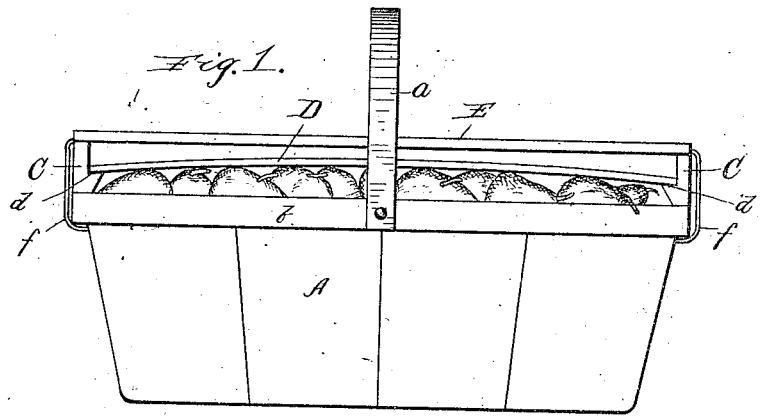
Figure 2:
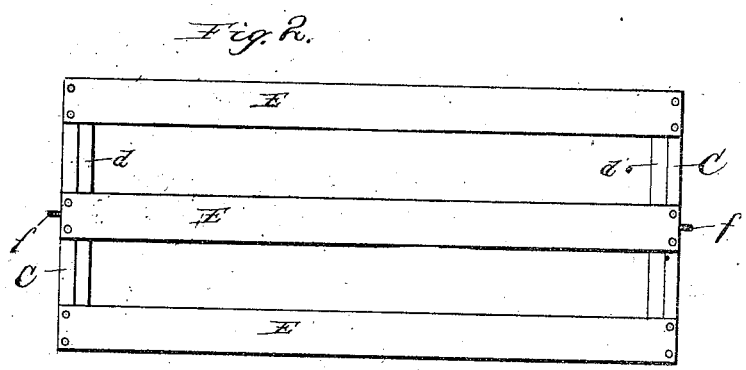
Figure 3:
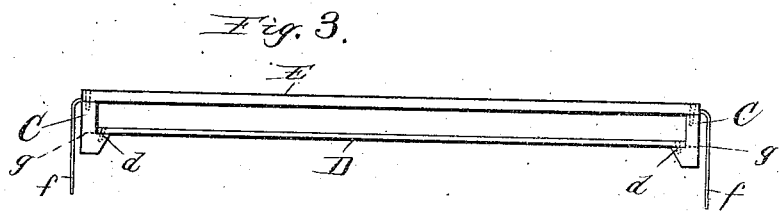

Figure 1 is an elevation of a basket provided with my improved cover. Fig. 2 is a plan, and Fig. 3 is an edge view, of the cover detached and ready for application to the basket.

In the drawings, A represents an ordinary fruit-basket, having a handle, a, and a top band, b.

C C represent the end pieces of my improved cover. They are adapted to rest upon the top edge of the basket and conform to the ends thereof in shape, whether round, square, or other form. To these end pieces is secured a lower row of light slats, D, and an upper row of preferably heavier slats, E. The latter are best secured by nails to the top of the end pieces, while the former may be secured in like manner to ledges d, formed upon the end pieces. The lower row of slats is preferably made of thin stuff, so that they allow rounding up the contents something after the manner shown in Fig. 1, and so that they will press the fruit gently and hold it in place without bruising it. The upper slats are preferably heavier than the under ones, as they are intended to sustain the weight of the baskets piled on top of them without yielding sufficiently to come in contact with the fruit or with the lower slats, so that the fruit can be in no way injured by the piling. Of course the stiffness of the slats can be diminished if the distance between the two rows is increased to prevent contact between them.

At *f* are shown the wires for attaching the covers to the baskets.

The two rows of slats may be disconnected by providing each of them with separate end pieces—such as would be formed by cutting the end pieces in two upon the plane of the dotted line *g*, shown at Fig. 3—in which construction they could be used either separately or together; but when used together they would in effect be the equivalent of the construction set forth at large above, and which I deem the more desirable one.

By the use of my invention a decided benefit, aside from the avoidance of bruising the fruit, is found in the fact that a pile of baskets provided with my improved covers is perfectly ventilated, the cover of each basket giving the air freedom to circulate over the fruit contained in it, as well as under the fruit contained in the basket piled next above it. The prevention of bruising also enables the fruit-raiser to send riper fruit to market than is customary.

I claim—

1. The cover for fruit-packages, provided with a lower row of slats to keep the fruit in place, and an upper row of slats to take the weight in piling, substantially as set forth.

2. The combination, with a fruit-package, of an upper and a lower row of slats covering the package, and end pieces to which the slats are secured, substantially as set forth.

3. The combination of end pieces having ledges *d*, with upper slats, E, and lower slats, D, secured to said end pieces, substantially as set forth.

FREDERICK A. THOMAS.

Witnesses:
 H. M. MUNDAY,
 LEW. E. CURTIS.